United States Patent
Lentini et al.

(10) Patent No.: US 6,840,865 B2
(45) Date of Patent: Jan. 11, 2005

(54) SLIP SEAL RETAINER AND STOP

(75) Inventors: Anthony G. Lentini, St. Clair Shores, MI (US); William A. Konior, Clinton Township, MI (US); Ronald N. Brissette, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/293,763

(22) Filed: Nov. 13, 2002

(65) Prior Publication Data

US 2004/0092320 A1 May 13, 2004

(51) Int. Cl.[7] ................................................. F16D 3/06
(52) U.S. Cl. ....................................... 464/133; 464/162
(58) Field of Search ................................ 464/133, 162, 464/167, 170, 173; 277/549, 551, 576, 577

(56) References Cited

U.S. PATENT DOCUMENTS

| | | | |
|---|---|---|---|
| 2,510,362 A | * | 6/1950 | Anderson ................... 464/175 |
| 3,583,244 A | * | 6/1971 | Teinert .................. 464/173 X |
| 3,618,340 A | * | 11/1971 | Geisthoff et al. ........... 464/162 |
| 4,125,000 A | * | 11/1978 | Grob ......................... 464/162 |
| 4,475,737 A | * | 10/1984 | Cook et al. ................. 464/162 |
| 5,634,853 A | | 6/1997 | Smith |
| 5,735,747 A | | 4/1998 | Gehrke et al. |
| 5,772,520 A | | 6/1998 | Nicholas et al. |
| 5,853,177 A | | 12/1998 | Brissette et al. |
| 6,039,320 A | | 3/2000 | MacDonald |
| 6,183,370 B1 | | 2/2001 | Lim |
| 6,241,617 B1 | | 6/2001 | Jacob |
| 6,279,221 B1 | | 8/2001 | Glowacki et al. |
| 6,361,444 B1 | * | 3/2002 | Cheney et al. |

FOREIGN PATENT DOCUMENTS

EP  0 440 518 A1 * 8/1991 ................. 464/133

* cited by examiner

*Primary Examiner*—Greg Binda
(74) *Attorney, Agent, or Firm*—Carlson, Gaskey & Olds

(57) ABSTRACT

A sealing assembly for a slip shaft drive assembly includes a generally resilient seal and a substantially rigid cover which is mounted at an end of a slip yoke. The cover includes an axially extended stop portion which is of an axial length to provide contact with a flange of a splined shaft prior to an end of the splined shaft contacting a plug. The stop portion defines the minimum length to which the slip shaft drive assembly may be collapsed and thereby eliminates the possibility of the plug being dislodged during shipping and/or handling.

18 Claims, 2 Drawing Sheets

SLIP SEAL RETAINER AND STOP

BACKGROUND OF THE INVENTION

The present invention relates to a slip shaft driveline assembly, and more particularly to a cover that protects a seal for closing one end of a driveline slip yoke and operates as a stop during shipping.

Drive trains for use in heavy-duty applications often include a slip yoke connection for connecting a splined shaft to a universal joint. A conventional slip yoke includes a central, longitudinal bore that receives a splined portion on a connection shaft. The splined shaft typically moves axially within the slip yoke bore. Lubricant is provided within the slip yoke bore to facilitate the relative axial movement between the splined shaft and the slip yoke. Each end of the slip yoke bore is preferably sealed to maintain the lubricant within the bore and to prevent undesirable contaminants from entering the bore. One end of the slip yoke bore can be plugged. The other end, however, requires a sealing arrangement that seals the moving splined shaft as it moves axially through the slip yoke bore while a portion of the splined shaft remains outside of the slip yoke.

Slip yokes are often designed to perform over extensive periods without requiring any maintenance. Such systems require that all lubrication in the system be maintained within the slip yoke while keeping all contaminants out of the system. Accordingly, sufficient fluid-tight sealing is required at each end of the slip yoke bore.

In some instances, the splined shaft may be inadvertently collapsed past a designed minimum length during shipping. If enough force is exerted, the universal joint may over compress the seal such that an end of the splined shaft forces the plug from an installed position. Loss of the plug may result in the loss of lubrication and the introduction of contamination into the drive train.

Accordingly, it is desirable to provide a seal arrangement which prevents the collapse of the drive train beyond a designed minimum length during shipping and which need not be removed upon vehicle installation.

SUMMARY OF THE INVENTION

The slip shaft drive assembly according to the present invention provides a sealing assembly that includes a generally resilient seal and a substantially rigid cover which is mounted at an end of a slip yoke.

The placement of the cover over the seal and a substantial portion of the outer surface of a sealing portion prevents the seal from expanding, becoming dislodged or being deformed during use. The cover therefore maintains the seal in proper engagement with the end of the slip yoke. Further, the substantially rigid cover protects the seal from being damaged by contact with debris during operation.

The cover includes an axially extended stop portion which is of an axial length to provide contact with a flange of a splined shaft prior to an end of the splines shaft contacting a plug. The stop portion defines the minimum length to which the slip shaft drive assembly may be collapsed and thereby eliminates the possibility of the plug being dislodged during shipping and/or handling. Moreover, as the slip shaft drive assembly has a minimum installed length greater than the minimum collapsed length when uninstalled, the stop portion does not interfere with operation when the slip shaft drive assembly is mounted for operation in a vehicle.

The present invention therefore provides a seal arrangement which prevents the collapse of the drive train beyond a designed minimum length during shipping and which need not be removed upon vehicle installation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
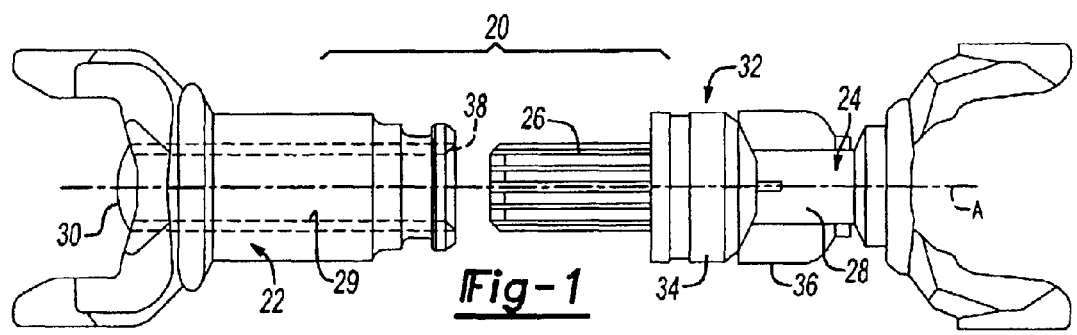
FIG. 1 is a general perspective view of a slip shaft drive assembly designed according to this invention.

FIG. 1 illustrates a general perspective view of a slip shaft drive assembly 20 that includes a slip yoke 22 and a splined shaft 24. The shaft 24 includes a splined portion 26 and a neck portion 28. The outer diameter of the splined portion 26 is greater than the outer diameter of the neck portion 28. The shaft 24 is received within a central bore 29, which extends axially through the slip yoke 22. The shaft 24 is slidably received within the bore 29 such that the shaft 24 can move axially along axis A relative to the slip yoke 22. Lubricant preferably is placed within the bore 29 to facilitate the relative axial movement between the shaft 24 and the yoke 22.

A sealing plug 30 is provided at one end of the slip yoke 22. The sealing plug 30 contains the lubricant within the bore 29 of slip yoke 22. The sealing plug 30 may be removed prior to vehicle installation or left in place depending upon the shaft drive assembly 20. Moreover, the plug 30 and a sealing assembly 32 allows for relatively long term storage of the slip shaft drive assembly 20 and lubricant.

Figure 2:
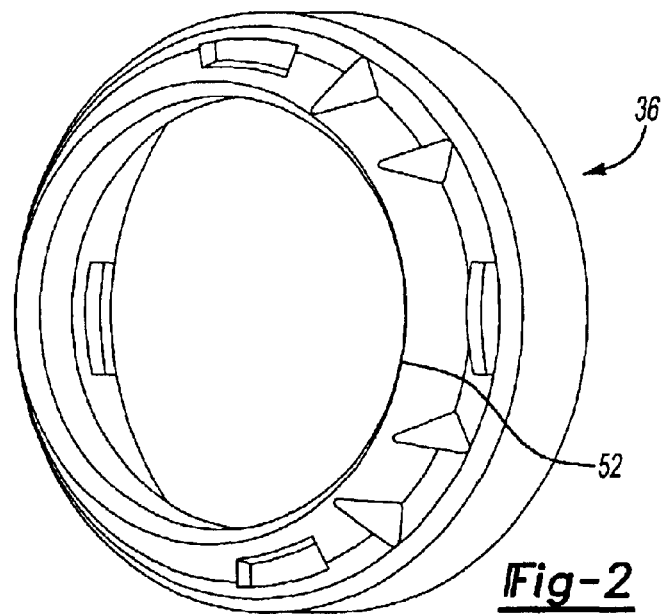
FIG. 2 is a perspective view of an inventive cover.

The sealing assembly 32 that includes a generally resilient seal 34 and a substantially rigid cover 36 is mounted at an end 38 of the slip yoke 22. The seal 34 is preferably made of a resilient material such as rubber. The cover 36 preferably is substantially rigid and made from a metal material. The cover 36 is a cylindrical member (FIG. 2).

When the shaft 24 is received within the bore 29, the neck portion 28 extends beyond and outside of the end 38 of the slip yoke 22. The sealing assembly 32 permits the shaft 24 to move axially relative to the slip yoke 22 while maintaining lubricant within the bore 29 and keeping undesirable contaminants from entering the bore 29.

Figure 3:
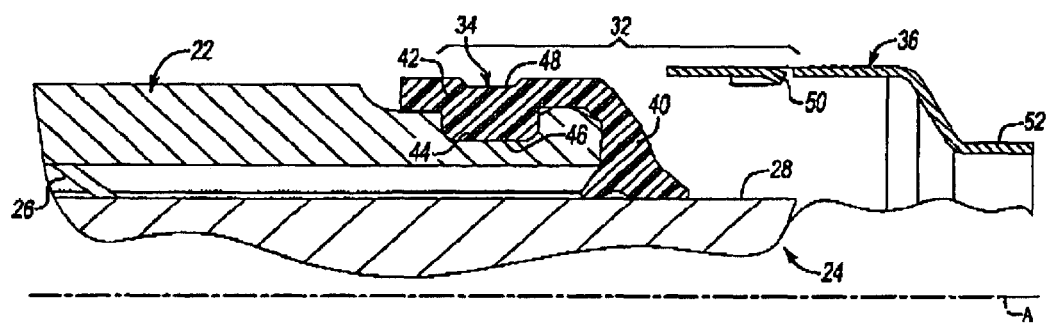
FIG. 3 is a side partial cross-sectional view of the slip shaft drive assembly and cover.

Referring to FIG. 3, the sealing assembly 32 includes the seal 34 and the cover 36. The seal 34 includes a sealing portion 40 and a mounting portion 42. The sealing portion 40 of the seal 34 must be resilient because it has to be able to stretch over the splined portion 26 during assembly but sealingly engage the outer surface of the smaller neck portion 28.

The mounting portion 42 preferably includes a shoulder 44 that is received within a groove 46, defined on an outer surface of the slip yoke 22 adjacent the end 38. The shoulder 44 and the groove 46 preferably are annular. The mounting portion 42 extends generally axially along a portion of the slip yoke 22 when the sealing assembly 32 is positioned on the slip yoke 22.

The seal 34 is initially placed onto the shaft 24, with the inner lips being pulled over the splines 26. In addition, at this time, cover 36 is first placed on the shaft 24. The seal is engaged with shaft 24 by snapping shoulder 44 into groove 46. The cover 36 is preferably snapped over the seal 34.

The seal 34 includes a groove 48 that is annular and extends around the outer circumference of the seal 34. The cover 36 includes a plurality of radially inwardly projecting tabs 50 that abuttingly engage one edge within the groove 48. At least three tabs 50 preferably are provided. Alternatively, a plurality of circumferentially spaced notches may be provided in place of the groove.

The placement of the cover 36 over the seal 34 and a substantial portion of the outer surface of the sealing portion 40 prevents the seal 34 from expanding, becoming dislodged or being deformed during use. The cover 36 therefore maintains the seal in proper engagement with the end 38 of the slip yoke 22. Further, the substantially rigid cover 36 protects the seal 34 from being damaged by contact with debris during operation.

Figure 4:
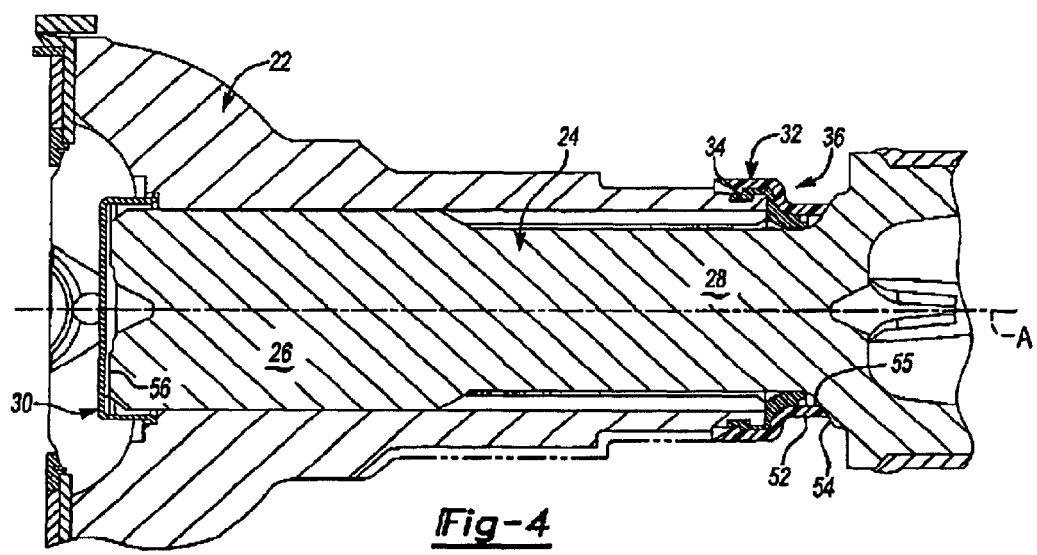
FIG. 4 is a side partial cross-sectional view of the slip drive assembly and cover in a fully collapsed position.

Referring to FIG. 4, the sealing assembly 32 is illustrated in an assembled condition. The cover 36 preferably includes an annular axially extended stop portion 52 defined along axis A. The stop portion 52 is preferably of a diameter less than the portion of the cover 36 which engages the seal 34. The stop portion 52 defines an opening which is of a larger diameter than splined tooth portion 26. It should be understood char the stop portion 52 need not be completely annular.

The stop portion 52 is of an axial length to provide contact with a flange 54 of the spline shaft 24 prior to an end 56 of the spline shaft 24 contacting plug 30. It should be understood that flange 54 may be a portion of a universal joint or other larger diameter portion of spline shaft 24.

Stop portion 52 defines the minimum length to which the slip shaft drive assembly 20 maybe collapsed and thereby eliminates the possibility of the plug 30 being dislodged during shipping and/or handling. Moreover, as the slip shaft drive assembly 20 is designed to have a minimum installed length greater than the minimum collapsed length when uninstalled, the stop portion 52 does not interfere with operation when the slip shaft drive assembly 20 when mounted for operation in a vehicle.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A slip shaft drive assembly comprising:
   a slip yoke comprising a longitudinal bore extending between first and second ends;
   a shaft slidably received in said first end of said bore and guided for axial movement between a collapsed and an extended position;
   a plug mounted to said second end of said bore;
   a seal mounted to an outer periphery of said slip yoke and said first end to engage a portion of said shaft; and
   a cover mounted to said slip yoke and said first end, said cover comprising a stop portion engageable with a portion of said shaft to prevent contact between an inner end of said shaft and said plug when said shaft moves toward said collapsed position.

2. The slip shaft drive assembly as recited in claim 1, wherein said seal engages a groove within said outer periphery of said slip yoke.

3. The slip shaft drive assembly as recited in claim 2, wherein said cover engages a groove within an outer periphery of said seal.

4. The slip shaft drive assembly as recited in claim 1, wherein said stop portion comprises an annular portion.

5. The slip shaft drive assembly as recited in claim 1, wherein said stop portion contacts a flange portion of said shaft.

6. The slip shaft drive assembly as recited in claim 1, wherein said stop portion defines an opening of a greater diameter than an outer diameter of a splined tooth portion of said shaft.

7. The slip shaft drive assembly as recited in claim 1, wherein said cover is mounted to an outer periphery of said seal.

8. A slip shaft drive assembly comprising:
   a slip yoke having a longitudinal bore extending between first and second ends;
   a shaft slidably received in said first end of said bore and guided for axial movement between a collapsed and an extended position;
   a seal mounted to an outer periphery of said slip yoke at said first end said seal engaging a portion of said shaft; and
   a cover mounted to said seal, said cover comprising a stop portion engageable with a portion of said shaft to prevent collapse of said shaft past said second end of said bore when said shaft moves toward said collapsed position.

9. The slip shaft drive assembly as recited in claim 8, wherein said stop portion comprises an annular portion.

10. The slip shaft drive assembly as recited in claim 8, wherein said stop portion contacts a flange portion of said shaft.

11. The slip shaft drive assembly as recited in claim 8, wherein said stop portion defines an opening of a greater diameter than an outer diameter of a splined tooth portion of said shaft.

12. The slip shaft drive assembly as recited in claim 8, further comprising a plug mounted to said second end of said bore to retain a lubricant therein.

13. The slip shaft drive assembly as recited in claim 8, further comprising a plug mounted to said second end of said bore, said stop portion engageable with said portion of said shaft to prevent contact between an inner end of said shaft and said plug when said shaft moves toward said collapsed position.

14. The slip shaft drive assembly as recited in claim 13, further comprising a plug mounted to said second end of said bore, said stop portion engageable with said portion of said shaft to prevent dislodgment of said plug when said shaft moves toward said collapsed position.

15. The slip shaft drive assembly as recited in claim 8, wherein said cover is mounted to an outer periphery of said seal.

16. A slip shaft drive assembly comprising:
   a slip yoke comprising a longitudinal bore extending between first and second ends;

a shaft slidably received in said first end of said bore and guided for axial movement between a collapsed and an extended position;

a plug mounted to said second one end of said bore;

a seal mounted to said slip yoke at said first end to engage a portion of said shaft; and a cover engaged in a groove within an outer periphery of said seal, said cover comprising a stop portion engageable with a portion of said shaft to prevent contact between an inner end of said shaft and said plug when said shaft moves toward said collapsed position.

17. A slip shaft drive assembly comprising:

a slip yoke comprising a longitudinal bore extending between first and second ends;

a shaft slidably received in said first end of said bore and guided for axial movement between a collapsed and an extended position;

a plug mounted to said second end of said bore;

a seal mounted to said slip yoke at said first end to engage a portion of said shaft; and a cover mounted to said slip yoke at said first end, said cover comprising a stop portion which defines an opening of a greater diameter than an outer diameter of a splined tooth portion of said shaft, said stop portion engageable with a portion of said shaft to prevent contact between an inner end of said shaft and said plug when said shaft moves toward said collapsed position.

18. A slip shaft drive assembly comprising:

a slip yoke having a longitudinal bore extending between first and second ends;

a shaft slidably received in said first end of said bore and guided for axial movement between a collapsed and an extended position;

a seal mounted to said slip yoke at said first end to engage a portion of said shaft; and a cover mounted to said seal, said cover comprising a stop portion which defines an opening of a greater diameter than an outer diameter of a splined tooth portion of said shaft, said stop portion engageable with a portion of said shaft to prevent collapse of said shaft past said second end of said bore when said shaft moves toward said collapsed position.

* * * * *

UNITED STATES PATENT AND TRADEMARK OFFICE
CERTIFICATE OF CORRECTION

PATENT NO. : 6,840,865 B2
DATED : January 11, 2005
INVENTOR(S) : Lentini et al.

It is certified that error appears in the above-identified patent and that said Letters Patent is hereby corrected as shown below:

Column 5,
Line 4, please delete "one".

Signed and Sealed this

Fifth Day of April, 2005

JON W. DUDAS
*Director of the United States Patent and Trademark Office*